United States Patent
Jiang et al.

(10) Patent No.: US 10,783,661 B2
(45) Date of Patent: Sep. 22, 2020

(54) POSITIONING METHOD AND ROBOT USING THE SAME

(71) Applicant: UBTECH ROBOTICS CORP LTD, Shenzhen (CN)

(72) Inventors: Chenchen Jiang, Shenzhen (CN); Youjun Xiong, Shenzhen (CN); Zhichao Liu, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 16 days.

(21) Appl. No.: 16/416,281

(22) Filed: May 20, 2019

(65) Prior Publication Data

US 2020/0005487 A1    Jan. 2, 2020

(30) Foreign Application Priority Data

Jun. 28, 2018  (CN) .......................... 2018 1 0691846

(51) Int. Cl.
| | | |
|---|---|---|
| *G06T 7/73* | (2017.01) | |
| *G06T 7/80* | (2017.01) | |
| *H04W 8/02* | (2009.01) | |
| *H04W 56/00* | (2009.01) | |

(52) U.S. Cl.
CPC .................. *G06T 7/74* (2017.01); *G06T 7/80* (2017.01); *H04W 8/02* (2013.01); *G06T 2207/30244* (2013.01); *H04W 56/001* (2013.01)

(58) Field of Classification Search
CPC ... G06T 7/74; G06T 7/80; G06T 2207/30244; G06T 7/579; G06T 7/73; H04W 8/02; H04W 56/001; G01C 21/20
See application file for complete search history.

(56) References Cited

U.S. PATENT DOCUMENTS

| | | | |
|---|---|---|---|
| 10,328,573 B2* | 6/2019 | Williams | ............... B25J 9/1697 |
| 2016/0349362 A1* | 12/2016 | Rohr | ..................... G01S 5/0263 |
| 2016/0353238 A1* | 12/2016 | Gherardi | ................. H04B 1/69 |
| 2017/0023659 A1* | 1/2017 | Bruemmer | ............. G01S 19/00 |

* cited by examiner

*Primary Examiner* — Yon J Couso

(57) ABSTRACT

The present disclosure provides a positioning method and a robot using the same. The method includes: obtaining, through the visual sensor, a current frame image; obtaining, through the ultra-wideband tag, distance of a robot from an ultra-wideband anchor; performing a feature matching on the current frame image and an adjacent frame image to generate partial map point(s); determining whether the current frame image is a key frame image; and optimizing a pose of the visual sensor corresponding to the key frame image through a joint objective function in response to the current frame image being the key frame image, where the joint objective function at least comprises a distance cost function of the ultra-wideband anchor and a visual residual cost function. Through the above-mentioned method, the accuracy of the positioning of the robot can be improved.

17 Claims, 6 Drawing Sheets

POSITIONING METHOD AND ROBOT USING THE SAME

CROSS REFERENCE TO RELATED APPLICATION PROGRAMS

This application claims priority to Chinese Patent Application No. CN201810691846.2, filed Jun. 28, 2018, which is hereby incorporated by reference herein as if set forth in its entirety.

BACKGROUND

1. Technical Field

The present disclosure relates to robot visual positioning technology, and particularly to a positioning method and a robot using the same.

2. Description of Related Art

The positioning and navigation based on machine vision is a key point of robot technology. However, the existing visual schemes are still not robust enough, and often have the problems such as tracking loss and relocation failure.

In most of the visual SLAM (simultaneous localization and mapping) systems, environmental feature maps are constructed by using visual image feature extraction and matching methods, and realize simultaneous positioning by estimating the current pose (i.e., the position and the posture) of a robot. Since there have noises in the pose estimation and the map construction, there has uncertainty especially for the SLAM process in large-scale environments. In the filter-based SLAM methods such as the EKF-SLAM (extended Kalman filter SLAM) and the PF-SLAM (particle filter SLAM), they all use probabilistic methods to represent the uncertainty of observed information, and the road signs are considered to be independent. As a result, after a long-term execution, the amount of the road signs will be increased until the computer resources are insufficient to update the map in real time, and the methods which take nonlinearity as linearity will lead to errors. Hence, any data associated errors will be brought into the SLAM state estimation, which causes the problems such as inaccurate positioning and low positioning accuracy of the robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

UWB (ultra wide band) is a wireless communication technology that transmits data at high speed in a short distance with very low power. UWB has many advantages such as good anti-interference performance, high transmission rate, wide bandwidth, low power consumption, and small transmission power. In addition, since it has large system capacity while the transmission power is very small, its electromagnetic wave radiation has little impact on the human body, hence it is used broadly.

In the technical solutions adopted by the present disclosure, a single UWB device is used to assist in enhancing the robustness of the machine visual positioning. Besides, in the embodiments of the present disclosure, UWB devices such as UWB anchor (i.e., base station) can be integrated into a charging station of the robot, thereby saving the UWB anchor to be installed and fasciate the movement of the robot. In other embodiments, the UWB anchor may also be integrated into other devices of the robot or the robot itself, which is not limited herein.

Figure 1:
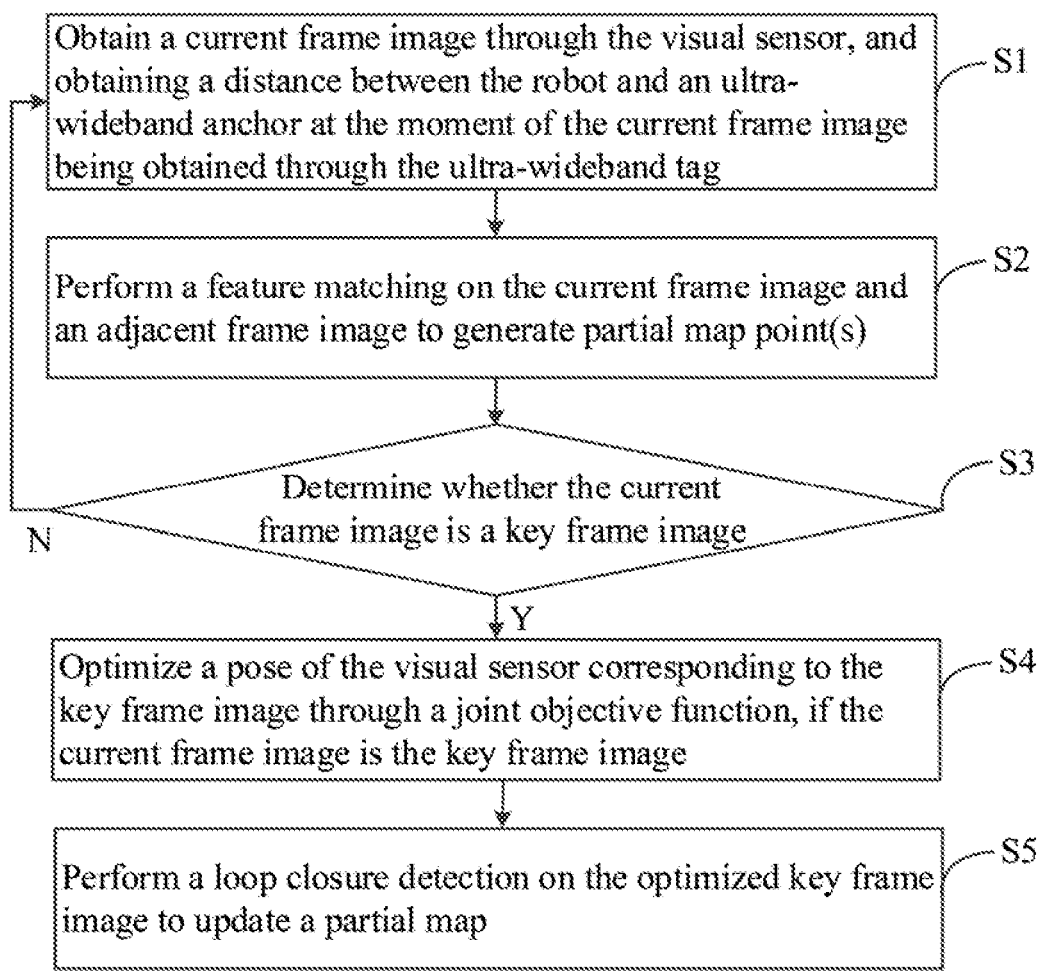
FIG. 1 is a flow chart of an embodiment of a positioning method according to the present disclosure.
Figure 5:
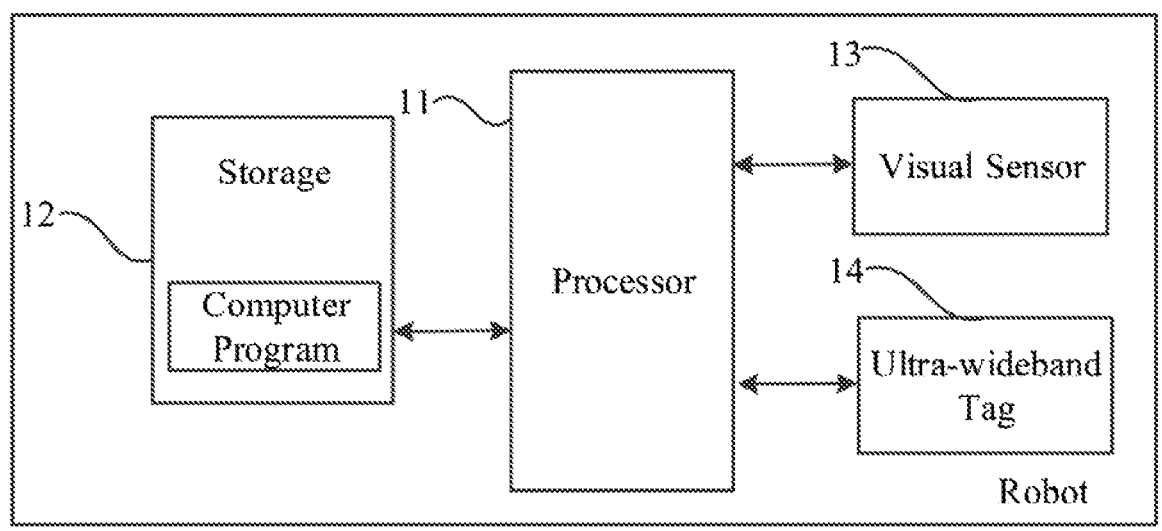
FIG. 5 is a schematic block diagram of an embodiment of a robot according to the present disclosure.

FIG. 1 is a flow chart of an embodiment of a positioning method according to the present disclosure. In this embodiment, a positioning method for a robot is provided. The method is a computer-implemented method executable for a processor, which may be implemented through to a robot as shown in FIG. 5, or through a storage medium. As shown in FIG. 1, the positioning method includes the following steps.

S1: obtaining a current frame image through the visual sensor, and obtaining a distance between the robot and an ultra-wideband anchor at the moment of the current frame image being obtained through the ultra-wideband tag.

Figure 2:
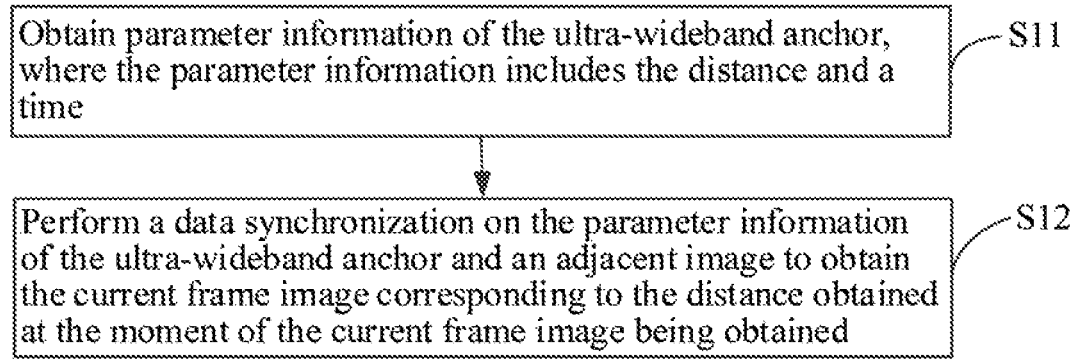
FIG. 2 is a flow chart of an embodiment of step S1 of the positioning method of FIG. 1.

In this embodiment, the scanning frequency of the UWB anchor and the scanning frequency of a visual sensor such as a camera may not be synchronized. For example, when the frequency of the camera to scan one frame of image is 30 Hz, the scanning frequency of the UWB anchor may be 10 Hz, that is, not every frame of image corresponds to a distance. The obtained distance is the distance between the robot and the ultra-wideband anchor while the current frame image is obtained. In the other embodiments, the scanning frequencies of the camera and the UWB may be the same, which is not limited herein. For the case that the scanning frequencies of the two are different, it is necessary to synchronize the data between the two. FIG. 2 is a flow chart of an embodiment of step S1 of the positioning method of FIG. 1. As shown in FIG. 2, in this embodiment, step S1 of the positioning method includes the following sub-steps.

S11: obtaining parameter information of the ultra-wideband anchor, where the parameter information includes the distance and a time.

In this embodiment, the UWB system includes the UWB anchor and a UWB tag. The UWB anchor is disposed inside a charging station of the robot, and the positioning tag is an active tag disposed on the robot. The UWB anchor can provide the absolute distance of the robot to the UWB anchor and the time, that is, the UWB anchor transmits a signal to the UWB tag, and the absolute distance of the robot from the UWB anchor can be calculated through the returning time of the UWB tag. In other embodiments, the UWB tag may transmits a UWB pulse signal, and the UWB anchor receives the signal and calculates the absolute distance of the robot from the UWB anchor, which is not limited herein.

S12: performing a data synchronization on the parameter information of the ultra-wideband anchor and an adjacent image to obtain the current frame image corresponding to the distance obtained at the moment of the current frame image being obtained.

As described above, the scanning frequencies of the camera and the UWB anchor may be different. After obtaining the parameter information of the UWB anchor, it need to perform the data synchronization between the data of UWB and that of visual sensor such as camera to make the time difference of them be smallest, so as to obtain the current frame image corresponding to the absolute distance between the robot and the UWB anchor.

S2: performing a feature matching on the current frame image and an adjacent frame image to generate partial map point(s).

Figure 3:
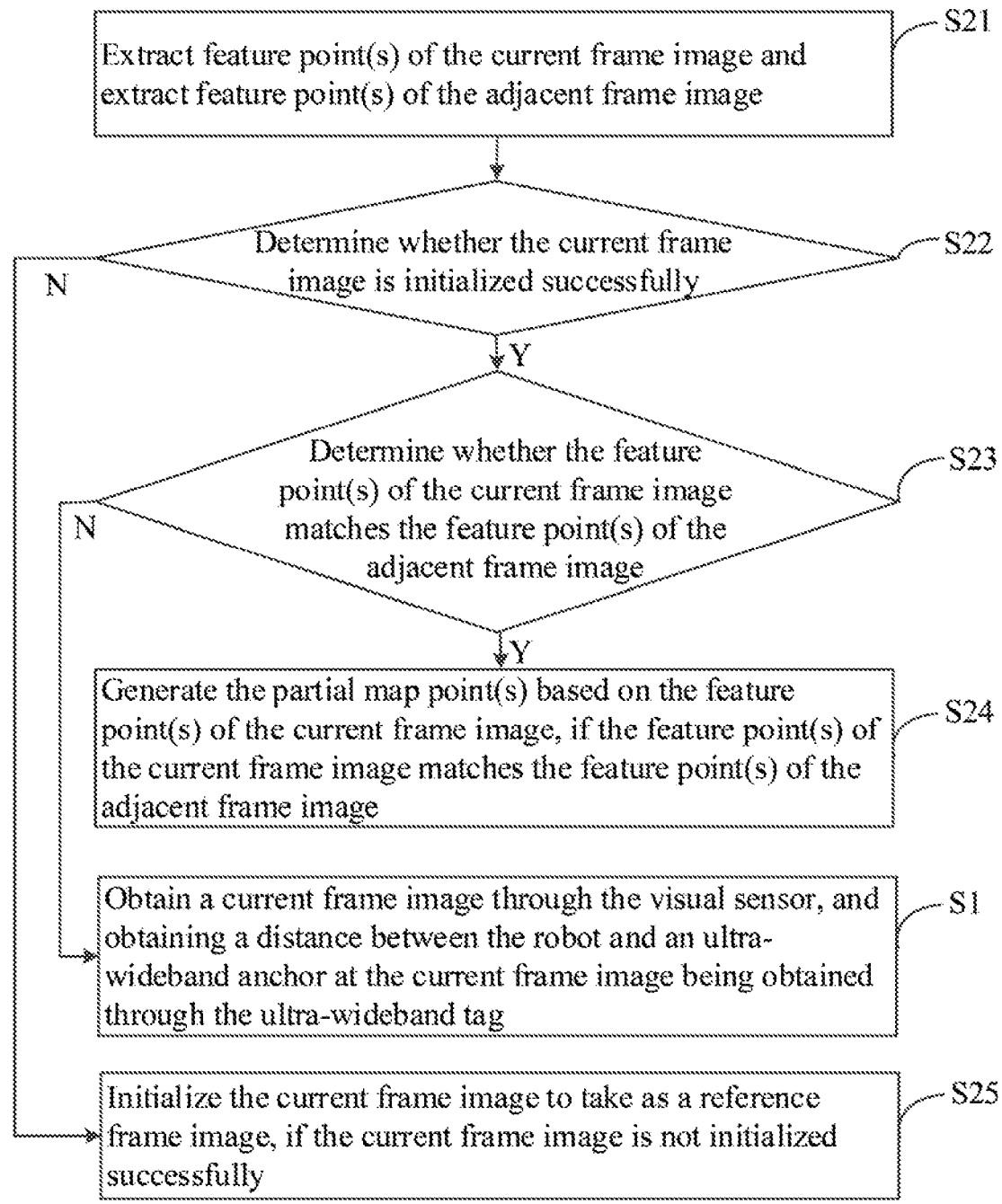
FIG. 3 is a flow chart of an embodiment of step S2 of the positioning method of FIG. 1.

The feature matching is a critical step in the visual SLAM. Generally speaking, the feature matching solves the data association in the SLAM, that is, determines the correspondence between the currently recognized road signs and the previously recognized road signs. By accurately matching the descriptor between the images or the descriptor between the image and the map, the burden of the subsequent estimations, optimizations, and the like for the gesture of the robot can be relieved for a large extent. FIG. 3 is a flow chart of an embodiment of step S2 of the positioning method of FIG. 1. As shown in FIG. 3, in this embodiment, step S2 of the positioning method includes the following sub-steps.

S21: extracting feature point(s) of the current frame image and extracting feature point(s) of the adjacent frame image.

In step S21, the ORB feature extraction algorithm is generally adopted, that is, the corner points in the image are extracted by using the FAST focus extraction algorithm first, and then the binary feature descriptor is generated by using the BRIEF feature description algorithm, which has a fast execution speed. In which, the ORB feature extraction algorithm can be divided into two steps. The FAST feature point extraction algorithm is used to obtain the feature point(s) on the image first, then the concept of the intensity centroid is used to calculate the direction of the feature point(s) while the binary ORB descriptor is generated by using the BRIEF feature description algorithm.

The FAST feature point detection is based on the pixel point(s) on the circumference of a circle which takes a candidate point as the center and a preset length as the radius, and compares the grayscale value of each pixel on the circumference with the grayscale value of the candidate point to determine whether the candidate point is a feature point. If there are continuous three-quarters of the points on the circumference which have the grayscale value with a difference with respect to the grayscale value of the center that has the same sign and larger than a preset threshold, it can be assumed that the center is the feature point. In this embodiment, through the above-mentioned algorithm, the extraction of the feature points of the current frame image and the adjacent frame image can be implemented. In addition, after the feature point(s) of the current frame image is extracted, an image de-distortion processing may be performed on the extracted feature point(s) of the current frame image.

S22: determining whether the current frame image is initialized successfully.

In step S22, it is further determined whether the current frame image is initialized successfully. For example, the first frame of the image obtained by a visual sensor such as the camera may be used as a reference frame image (i.e., a reference standard). The feature point(s) are extracted from the first frame of the image, and a normalization is performed on the feature point(s) to obtain a relative coordinate system after the de-distortion processing is performed on the feature point(s). In which, the normalization is to convert the original image to be processed into a corresponding unique and standard form through some column transformations (i.e., finding a set of parameters by using the invariant moment of the image so as to eliminate the influence of other transformation functions to the image), where the image of the standard form has invariant characteristics for frequency domain and affine transformations such as rotation and scaling.

After obtaining the current frame image, the coordinate of the feature point(s) after the de-distortion processing that is obtained in step S21 is initialized, that is, the obtained current frame image is initialized by taking the first frame image as the reference frame image (i.e., the reference standard). If it is determined that the current frame image is successfully initialized, step S23 is executed; otherwise, if it is determined that the current frame image initialization fails, step S25 is executed.

S23: determining whether the feature point(s) of the current frame image matches the feature point(s) of the adjacent frame image.

If the obtained feature point of the current frame image is successfully initialized, in step S23, it is further determined whether the feature point(s) of the current frame image and the feature point(s) of the adjacent frame images match. In which, the image feature matching is the most commonly used processing method in computer vision technology, and has been widely used in many technologies such as image stitching. Generally speaking, when performing feature matching on two frames of images, it is necessary to calculate the distance between the feature descriptors of the corresponding feature points of the two frames of images, and determine whether the matching is successful according to the magnitude of the distance. In this embodiment, the feature descriptors in the current frame image and the adjacent frame image are extracted separately.

In one embodiment, it is further determined whether the distance between the feature descriptor in the current frame image and the feature descriptor in the adjacent frame image meets a preset threshold. The distance determination criterion between the feature descriptors may be as follows:

1. Single threshold method: giving a threshold, and determining the matching between the feature points to be successful when the distance of the feature descriptors between the feature points is less than the threshold;

2. Nearest method: giving a relatively smaller threshold, finding the smallest distance of the feature descriptors between the feature points, and determining the matching to be successful when the distance is less than the threshold; and 3. Nearest distance comparing method: select two candidate points which have the distance of the feature descriptors that is the nearest to and the second nearest to each other from the feature points, and determining the nearest candidate point as a matching point when the distance between the two candidate points is large, that is, when the distance of the feature descriptors of the two candidate points is larger than a certain threshold.

In other embodiments, other matching manners may also be adopted, which is not limited herein. Furthermore, if it is determined that the feature point(s) of the current frame image matches the feature point(s) of the adjacent frame image, step S24 is executed; otherwise, step S1 is executed.

S24: generating the partial map point(s) based on the feature point of the current frame image, if the feature point of the current frame image matches the feature point of the adjacent frame image.

If it is determined in step S23 that the feature point(s) of the current frame image and the feature point(s) of the adjacent frame image match, a calculation and a pose estimation of the visual sensor such as the camera are performed based on the matched feature points in the two frames of images, so as to construct the map point(s) corresponding to each feature point of the current frame image to compose the partial map point(s). Since the pose of the visual sensor has a fixed relationship with the pose of the robot, the pose of the robot can be obtained by converting the pose of the visual sensor based on the relationship.

S25: initializing the current frame image to take as a reference frame image, if the current frame image is not initialized successfully.

If it is determined in step S22 that the current frame image fails to be initialized, the current frame image is discarded and taken as the first frame of the reference frame image, and the current frame image is normalized so that the current frame image is taken as the new reference frame image; it continues to obtain a next frame image, initializes the next frame image and the current frame image, and performs the subsequent processing process similar to the processing process in the foregoing description. For details, refer to the forgoing detailed description, which are not described herein.

In addition, the step S2 may further include updating a movement speed of the camera to reduce a data range of a map database when performing matching on the feature point(s) of a key frame image in the subsequent step, thereby improving the efficiency of searching.

S3: determining whether the current frame image is a key frame image.

In the technologies of the processing, maintenance, searching, and the like for videos, detailed optimization and loop closure detection are not performed on each image, and only some key frames are processed so as to reduce the volume and speed up the transmission. In which, the key frames are some special frames during the movement of a visual sensor such as a camera, and the common method to select the key frames is to take and save a new key every specific time interval during the movement of the camera. The poses of the camera in these key frames will be carefully optimized, and those located between the two key frames can be ignored except what provides some map points on the map.

Optionally, the general method to select the key frame images can be divided into three categories, that is, time-based selection methods, space-based selection methods, and visual content-based selection methods. In which, in the time-based selection methods, the current frame image is taken as the key frame image every fixed time interval, and the fixed time interval may be realized by waiting a certain seconds or may be realized by passing a certain number of frames; in the space-based selection methods, the current frame is taken as the key frame image every certain distance or angle; and in the visual content-based selection method, whenever the visual content changes to a certain extent, the current frame image is taken as the key frame image, that is, the similarity between the images is calculated through image processing, and the changes of the visual contents between the images are measured to determine whether to take the current frame image as the key frame for representing the scene. In this embodiment, the method for selecting the key frame images may include the following conditions:

1. The current frame image should be separated from its previous key frame by at least 20 image frames, so as to avoid a large amount of redundant information between adjacent key frame images.

2. The current frame image and its previous key frame should have at least 50 identical feature points, so as to ensure that there is sufficient matching information between key frame images to obtain the suitable poses to be tracked.

3. The amount of the identical feature points between the current frame image and the reference key frame image should be less than 90% of the total amount of the feature points, so that there are sufficient image changes between the two adjacent key frame images.

In this embodiment, the selection method of the key frame images is realized by combining the visual content-based selection method and the time-based selection method, thereby ensuring the real-time performance of the system. In other embodiments, other selection method of the key frame images may be adopted, which is not limited herein. If it is determined that the current frame image is the key frame image, step S4 is executed; otherwise, if it is determined that the current frame image is not the key frame image, step S1 is executed.

S4: optimizing a pose of the visual sensor corresponding to the key frame image through a joint objective function, if the current frame image is the key frame image, where the joint objective function at least includes a distance cost function of the ultra-wideband anchor and a visual residual cost function.

In step S4, if it is determined that the current frame image is the key frame image, the key frame image is optimized by using the joint objective function. In the SLAM system, since the error in the calibration of the camera will affect the accuracy of 3D reconstruction, the error of tracking is reflected in the pose between some column of key frames and the reconstruction. In addition, the continuous accumulation of the errors will cause the pose in the subsequent image frame to be getting far away from the actual pose, which eventually affects the accuracy of the entire system. In the closed loop detection, the drift of the system can be reduced to a large extent through the detection closed loop and the fusion closed loop, so as to obtain the accurate poses and maps. However, only the closed loop detection is not enough, because there may not have a large amount of closed loops in a large-scale scene, which causes the entire visual SLAM system to degenerate into visual odometer and makes the error to increase continuously. Therefore, whenever each key frame image is inserted into the partial map, a partial optimization is needed to be performed on a part of the map which corresponds to the key frame image. In which, the partial optimization is only an optimization between a small part of the key frame images and the map points. It performs a partial optimization on each key frame image, and the accuracy of the pose in the key frame images and the map points can be improved with a little time since the consumed time of the partial optimization is not long.

Difference from the prior art, in this embodiment, the current frame image is optimized by using the joint objective function. In which, the joint objective function at least includes a distance cost function of the UWB anchor and a visual residual cost function, that is, the distance cost function of the UWB anchor is added based on the existing visual residual cost function, and the pose of the visual sensor corresponding to the key frame image is optimized by the two jointly. In which, in the prior art, the pose of the camera and the map points are generally taken as variables to be optimized and are optimized together, and the visual residual cost function includes:

$$\{X^i, R_1, t_1 \mid i \in P_L, I \in K_F\} = \operatorname*{argmin}_{X^i, R_1, t_1} \sum_{k \in K_F} \sum_{j \in X_k} \rho(E_{kj}); \text{ and} \quad (3)$$

$$E_{kj} = \|x_{(\cdot)}^j - \pi_{(\cdot)}(R_k X^j + t_k)\|_{\Sigma}^2; \quad (4)$$

where, $X^i$ is a coordinate of a to-be-optimized map point, $R_1$ is a to-be-optimized rotation pose of the visual sensor, $t_1$ is a to-be-optimized shift pose of the visual sensor, $P_L$ is a set of the coordinate of the to-be-optimized map points, $K_F$ is a set of a to-be-optimized position of the robot, $X_k$ is a set of matched points of the to-be-optimized map points and the key frame image when the robot is at the position k, $x_{(\cdot)}^j$ is a feature point when the key frame image and the to-be-optimized map point match, $\pi_{(\cdot)}(R_k X^j + t_k)$ is a coordinate of the to-be-optimized map point projected onto the key frame image, and $\rho$ is a kernel function of optimization.

In which, equation (4) represents the sum of the projection error of each to-be-optimized map point on each key frame image, that is, the error obtained by comparing the projected position of 3D map point and the matched 2D feature point on each image, which is referred to as the reprojection error, and the objective of the visual residual cost function to optimize is to obtain all the map points which can minimize the sum of the reprojection error and the pose of the key frame images.

Furthermore, the distance cost function of the UWB anchor includes:

$$p^* = \operatorname*{arg}_{p \in N_p} \min E_k(p_k); \text{ and} \quad (1)$$

$$E_k(p_k) = \sum_k \rho(\|p^{uwb} - p_k\| - d^k); \quad (2)$$

where, $p^{uwb}$ is a coordinate of the UWB anchor, $p_k$ is a predicted coordinate of the UWB tag, Np is a set of all position data of the UWB anchor in a partial optimization, and $d^k$ is an actual position of the robot obtained by the UWB anchor. In one embodiment, the predicted coordinate of the UWB tag may be calculated through a time difference between the current frame images bound to the UWB base station and a movement speed of the camera, that is, $p_k = [t_k + (t_{UWB} - t_{img})] \times V$, where V is the movement speed of the camera. Equation (I) is for optimizing the pose of the visual sensor. When the robot obtains the absolute distance information $d^k$ provided by the UWB anchor, the error between it and the predicted coordinate of the UWB tag is the smallest.

Hence, the joint objective function obtained by combining the visual residual cost function with the distance cost function of the UWB anchor includes:

$$\{X^i, R_1, t_1 \mid i \in P_L, I \in K_F\} = \operatorname*{argmin}_{X^i, R_1, t_1} \sum_{k \in K_F} \sum_{j \in X_k} \rho(E_{kj}) + \operatorname*{arg}_{p \in N_p} \min E_k(P_k).$$

In this embodiment, by combining the visual residual cost function and the distance cost function of the UWB anchor to iteratively optimize the pose corresponding to the current frame image and the map points, the accuracy of the positioning of the robot can be improved. In this case, only the map points in the partial map and the key frame images are optimized. In other embodiments, the map points in a global map and the key frame images can be optimized, which is not limited herein.

S5: performing a loop closure detection on the optimized key frame image to update a partial map.

The loop closure detection refers to detect whether the camera has passed through the same place, which affects the estimated trajectory and the correctness of the map over a long period of time. The loop closure detection is significant for the SLAM system, which provides an association between the current data and all the historical data. If the tracking algorithm is lost, the loop closure detection can be used for relocation. Therefore, the loop closure detection significantly improves the accuracy and robustness of the entire SLAM system.

In which, in this embodiment, the core problem of the loop closure detection algorithm is how to calculate the similarity between the images. The similarity can be calculated by using the word bag model. In the word bag model, a dictionary is generated, that is, the feature descriptors of all the stored key frame images that are extracted in above are clustered to form discrete words, and the K-means++ algorithm is used to cluster the feature point descriptors into k categories, and then the center of each category that is eventually clustered is a word in the visual dictionary. In order to perform efficient searches, the visual dictionary is stored in a hierarchical tree structure, and K-means clustering is performed on each layer of nodes again to obtain the next layer of nodes until a preset maximum depth is reached, so that the words of the dictionary are stored in multiple leaf nodes of the trees. The dictionary can accelerate the matching of the candidate frame image and the current frame image in the subsequent loop detection-geometry verification phase.

In the this embodiment, by combining the absolute distance of the robot to the UWB tag that is provided by the UWB anchor, the search range of the key frame images in the map database can be reduced, and the search range of the word bag model can be reduced, so that the word bag model does not need to search all the map data, thereby reducing the search time and improving the efficiency of the subsequent matching. In addition, the current frame image can be converted into a word bag vector through the visual dictionary, and the word bag vector of the current frame image and the word bag vector of all the key frame images in the searched range are filtered and matched. Furthermore, the similarity of the word bag vector of all the key frame images in the searched range is calculated separately. If the similarity meets a certain threshold, it can be determined that the current frame image is detected to have the loop closure in the partial map database; otherwise, if the similarity does not meet the threshold, it can be determined that the current frame image is detected to not have the loop closure in the partial map database, and map point data of the current frame image is added to the partial map database so as to update the data of the partial map.

In the above-mentioned embodiment, by optimizing the obtained key frame images through the joint objective function (which at least includes the distance cost function of the UWB anchor and the visual residual cost function), the accuracy of the positioning of the robot can be improved.

Figure 4:
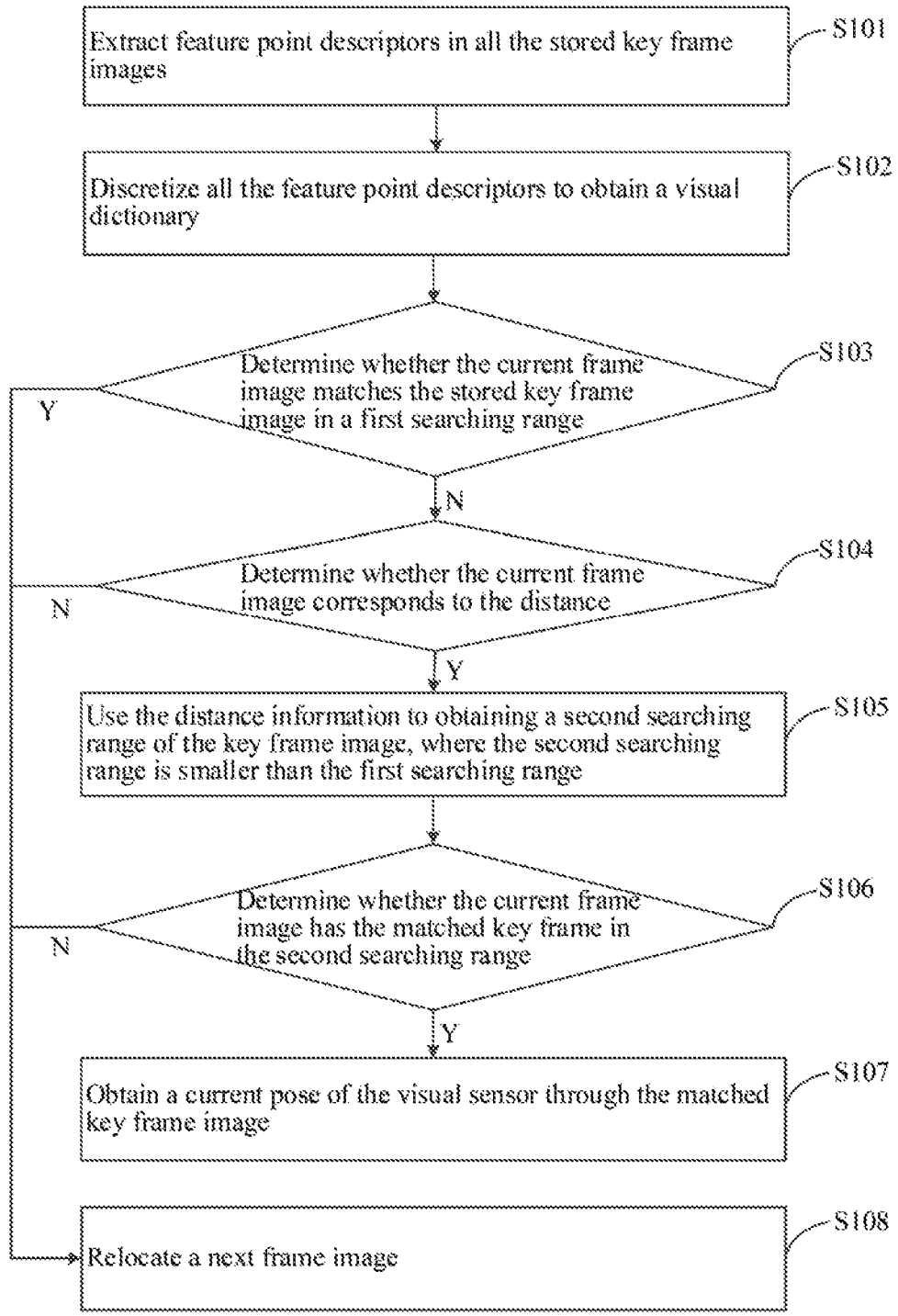
FIG. 4 is a flow chart of another embodiment of a positioning method according to the present disclosure.

FIG. 4 is a flow chart of another embodiment of a positioning method according to the present disclosure. In this embodiment, a relocation of the robot is implemented based on the positioning method of FIG. 1. The relocation of the robot refers to using a single frame of image to estimate pose information of the camera without the prior pose information, in the case that the tracking of the visual sensor such as the camera of the robot is lost, or when the SLAM system is re-started in a known environment. As shown in FIG. 4, the positioning method includes the following steps after step S2 of the positioning method of FIG. 1.

S101: extracting feature point descriptors in all the stored key frame images.

S102: discretizing all the feature point descriptors to obtain a visual dictionary.

S103: determine whether the current frame image matches the stored key frame image in a first searching range.

S104: determining whether the current frame image corresponds to the distance.

S105: using the distance information to obtaining a second searching range of the key frame image, where the second searching range is smaller than the first searching range.

S106: determining whether the current frame image has the matched key frame in the second searching range.

S107: obtaining a current pose of the visual sensor through the matched key frame image.

S108: relocating a next frame image.

FIG. 5 is a schematic block diagram of an embodiment of a robot according to the present disclosure. As shown in FIG. 5, a robot is provided. The robot includes a processor 11, a storage 12, a visual sensor 13, and an ultra-wideband tag 14. When executing (instructions in) computer program(s) stored in the storage 12 (e.g., a memory), the processor 11 implements the steps in the above-mentioned embodiments of the positioning method, for example, steps S1-S5 shown in FIG. 1 as follows:

obtaining, through the visual sensor, a current frame image;

obtaining, through the ultra-wideband tag, a distance between the robot and an ultra-wideband anchor at the moment of the current frame image being obtained;

performing feature matching on the current frame image and an adjacent frame image to generate at least a partial map point;

determining whether the current frame image is a key frame image; and optimizing a pose of the visual sensor corresponding to the key frame image through a joint objective function, if the current frame image is the key frame image, where the joint objective function at least comprises a distance cost function of the ultra-wideband anchor and a visual residual cost function.

In which, a single UWB anchor can be used to improve the robustness of machine vision positioning. In addition, the UWB anchor can be integrated into a charging station of the robot, thereby saving the UWB anchor to be installed and fascinate the movement of the robot. In other embodiments, the UWB anchor may also be integrated into other devices of the robot, which is not limited herein. The UWB anchor provides the absolute distance from the robot to the UWB anchor, which can narrow the searching range during the visual relocation and enhance the speed and the reliability of the relocation. Moreover, in the subsequent optimization of the key frame images, the distance cost function of the UWB anchor and the visual residual cost function are added, which can improve the accuracy of the positioning of the robot.

In which, the processor 11 may be referred to as a central processing unit (CPU). The processor 11 may be an integrated circuit chip with signal processing capabilities. The processor 11 may also be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The processor in the above-mentioned apparatus can perform the corresponding steps in the above-mentioned method embodiments, hence the details are not described herein. For details, refer to the description of the corresponding steps.

In the above-mentioned embodiment, by optimizing the obtained key frame images through the joint objective function (which at least includes the distance cost function of the UWB anchor and the visual residual cost function), the accuracy of the positioning of the robot can be improved.

Figure 6:
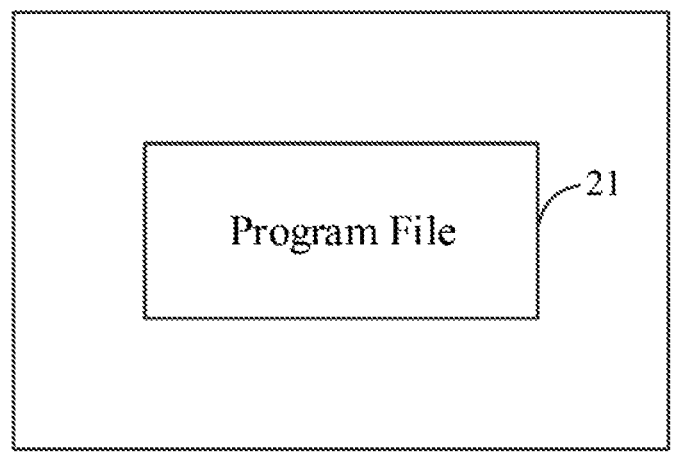
FIG. 6 is a schematic structural diagram of an embodiment of a storage device of the present disclosure.

FIG. 6 is a schematic structural diagram of an embodiment of a storage device of the present disclosure. As shown in FIG. 6, a storage device is provided. The storage device stores a program file 21 capable of implementing all of the above-mentioned methods. In which, the program file 21 may be stored in the storage device in the form of a software product which includes a plurality of instructions for causing a computer device (e.g., a personal computer, a server, and a network device) or a processor to perform all or part of the steps of the methods described in each embodiment. The above-mentioned storage device includes a USB disk, a mobile hard disk, a read-only memory (ROM), a random access memory (RAM), a magnetic disk, an optical disk, or other media that is capable of storing program codes, or the storage device may be a terminal device such as a computer, a server, a mobile phone, and a tablet.

In summary, those skilled in the art will readily understand that, the present disclosure provides a positioning method as well as an apparatus and a robot using the same. By optimizing the obtained key frame images through the joint objective function (which at least includes the distance cost function of the UWB anchor and the visual residual cost function), the accuracy of the positioning of the robot can be improved.

The forgoing description is only the embodiments of the present disclosure, which do not limit the scope of the present disclosure. Any equivalent structure or equivalent process transformation made by using the specification and the drawings of the present disclosure, or direct or indirect applications in other related technologies, are included within the scope of the present disclosure.

What is claimed is:

1. A computer-implemented positioning method for a robot having a visual sensor and an ultra-wideband tag, comprising executing on a processor the steps of:

obtaining, through the visual sensor, a current frame image;

obtaining, through the ultra-wideband tag, a distance between the robot and an ultra-wideband anchor at the moment of the current frame image being obtained;

performing a feature matching on the current frame image and an adjacent frame image to generate at least a partial map point;

determining whether the current frame image is a key frame image; and optimizing a pose of the visual sensor corresponding to the key frame image through a joint objective function, in response to the current frame image being the key frame image, wherein the joint objective function at least comprises a distance cost function of the ultra-wideband anchor and a visual residual cost function.

2. The method of claim 1, wherein the distance cost function of the ultra-wideband anchor comprises:

$$p^* = \underset{p \in N_p}{arg} \min E_k(p_k); \text{ and}$$

$$E_k(p_k) = \sum_k \rho(\|p^{uwb} - p_k\| - d^k);$$

where, $p^{uwb}$ is a coordinate of the ultra-wideband anchor, $p_k$ is a predicted coordinate of the UWB tag, Np is a set of all position data of the ultra-wideband anchor in a partial optimization, and $d^k$ is an actual position of the robot obtained by the ultra-wideband anchor.

3. The method of claim 2, wherein the visual residual cost function comprises:

$$\{X^i, R_1, t_1 \mid i \in P_L, I \in K_F\} = \underset{X^i, R_1, t_1}{argmin} \sum_{k \in K_F} \sum_{j \in X_k} \rho(E_{kj}); \text{ and}$$

$$E_{kj} = \|x_{(\cdot)}^j - \pi_{(\cdot)}(R_k X^j + t_k)\|_\Sigma^2;$$

where, $X^i$ is a coordinate of a to-be-optimized map point, $R_1$ is a to-be-optimized rotation pose of the visual sensor, $t_1$ is a to-be-optimized shift pose of the visual sensor, $P_L$ is a set of the coordinate of the to-be-optimized map points, $K_F$ is a set of a to-be-optimized position of the robot, $X_k$ is a set of matched points of the to-be-optimized map points and the key frame image when the robot is at the position k, $x_{(\cdot)}^j$ is a feature point when the key frame image and the to-be-optimized map point match, $\pi_{(\cdot)}(R_k X^j + t_k)$ is a coordinate of the to-be-optimized map point projected onto the key frame image, and $\rho$ is a kernel function of optimization;

wherein the joint objective function comprises:

$$\{X^i, R_1, t_1 \mid i \in P_L, I \in K_F\} = \underset{X^i, R_1, t_1}{argmin} \sum_{k \in K_F} \sum_{j \in X_k} \rho(E_{kj}) + \underset{p \in N_p}{arg} \min E_k(P_k).$$

4. The method of claim 1, wherein the step of obtaining, through the visual sensor, the current frame image comprises:

obtaining parameter information of the ultra-wideband anchor, wherein the parameter information comprises the distance and time; and performing a data synchronization on the parameter information of the ultra-wideband anchor and an adjacent image to obtain the current frame image corresponding to the distance obtained at the moment of the current frame image being obtained.

5. The method of claim 1, wherein after the step of optimizing the pose of the visual sensor corresponding to the key frame image through the joint objective function further comprises:

performing a loop closure detection on the optimized key frame image to update a partial map.

6. The method of claim 1, wherein the step of performing the feature matching on the current frame image and the adjacent frame image to generate at least a partial map point comprises:

extracting at least a feature point of the current frame image;

extracting at least a feature point of the adjacent frame image;

determining whether the feature point of the current frame image matches the feature point of the adjacent frame image; and generating at least a partial map point based on the feature point of the current frame image, in response to the feature point of the current frame image matching the feature point of the adjacent frame image.

7. The method of claim 6, wherein after the step of extracting the feature point of the current frame image further comprises:

determining whether the current frame image is initialized successfully; and initializing the current frame image to take as a reference frame image in response to the current frame image being not initialized successfully.

8. The method of claim 1, wherein after the step of performing the feature matching on the current frame image and the adjacent frame image to generate the partial map point further comprises:

determining whether the current frame image matches the stored key frame image in a first searching range;

determining whether the current frame image corresponds to the distance in response to the current frame image not matching the stored key frame image in the first search range;

using the distance to obtain a second searching range of the key frame image in response to the current frame image matching the stored key frame image in the first search range, wherein the second searching range is smaller than the first searching range;

determining whether the current frame image has the matched key frame image in the second searching range; and obtaining a current pose of the visual sensor through the matched key frame image in response to the current frame image having the matched key frame image in the second searching range.

9. A robot comprising:
a visual sensor;
an ultra-wideband tag;
a processor;
a memory; and
one or more computer programs stored in the memory and executable on the processor, wherein the one or more computer programs comprise:
instructions for obtaining, through the visual sensor, a current frame image;
instructions for obtaining, through the ultra-wideband tag, a distance between the robot and an ultra-wideband anchor at the moment of the current frame image being obtained;

instructions for performing feature matching on the current frame image and an adjacent frame image to generate at least a partial map point;

instructions for determining whether the current frame image is a key frame image; and instructions for optimizing a pose of the visual sensor corresponding to the key frame image through a joint objective function in response to the current frame image being the key frame image, wherein the joint objective function at least comprises a distance cost function of the ultra-wideband anchor and a visual residual cost function.

10. The robot of claim 9, wherein the distance cost function of the ultra-wideband anchor comprises:

$$p^* = {}^{arg}_{p \in N_p} \min E_k(p_k); \text{ and}$$

$$E_k(p_k) = \sum_k \rho(\|p^{uwb} - p_k\| - d^k);$$

where, $p^{uwb}$ is a coordinate of the ultra-wideband anchor, $p_k$ is a predicted coordinate of the UWB tag, Np is a set of all position data of the ultra-wideband anchor in a partial optimization, and $d^k$ is an actual position of the robot obtained by the ultra-wideband anchor.

11. The robot of claim 10, wherein the visual residual cost function comprises:

$$\{X^i, R_1, t_1 \mid i \in P_L, l \in K_F\} = {}^{argmin}_{X^i, R_1, t_1} \sum_{k \in K_F} \sum_{j \in X_k} \rho(E_{kj}); \text{ and}$$

$$E_{kj} = \|x^j_{(\cdot)} - \pi_{(\cdot)}(R_k X^j + t_k)\|^2_\Sigma;$$

where, $X^i$ is a coordinate of a to-be-optimized map point, $R_1$ is a to-be-optimized rotation pose of the visual sensor, $t_1$ is a to-be-optimized shift pose of the visual sensor, $P_L$ is a set of the coordinate of the to-be-optimized map points, $K_F$ is a set of a to-be-optimized position of the robot, $X_k$ is a set of matched points of the to-be-optimized map points and the key frame image when the robot is at the position k, $x_{(\cdot)}^j$ is a feature point when the key frame image and the to-be-optimized map point match, $\pi_{(\cdot)}(R_k X^j + t_k)$ is a coordinate of the to-be-optimized map point projected onto the key frame image, and $\rho$ is a kernel function of optimization;

wherein the joint objective function comprises:

$$\{X^i, R_1, t_1 \mid i \in P_L, l \in K_F\} = {}^{argmin}_{X^i, R_1, t_1} \sum_{k \in K_F} \sum_{j \in X_k} \rho(E_{kj}) + {}^{arg}_{p \in N_p} \min E_k(P_k).$$

12. The robot of claim 9, wherein the instructions for obtaining, through the visual sensor, the current frame image comprise:

instructions for obtaining parameter information of the ultra-wideband anchor, wherein the parameter information comprises the distance and time; and instructions for performing a data synchronization on the parameter information of the ultra-wideband anchor and an adjacent image to obtain the current frame image corresponding to the distance obtained at the moment of the current frame image being obtained.

13. The robot of claim 9, wherein the one or more computer programs further comprise:

instructions for performing a loop closure detection on the optimized key frame image to update a partial map.

14. The robot of claim 9, wherein the instructions for performing the feature matching on the current frame image and the adjacent frame image to generate at least a partial map point comprise:

instructions for extracting at least a feature point of the current frame image;

instructions for extracting at least a feature point of the adjacent frame image;

instructions for determining whether the feature point of the current frame image matches the feature point of the adjacent frame image; and instructions for generating at least a partial map point based on the feature point of the current frame image, in response to the feature point of the current frame image matching the feature point of the adjacent frame image.

15. The robot of claim 14, wherein the one or more computer programs further comprise:

instructions for determining whether the current frame image is initialized successfully; and instructions for initializing the current frame image to take as a reference frame image in response to the current frame image being not initialized successfully.

16. The robot of claim 9, wherein the one or more computer programs further comprise:

instructions for determining whether the current frame image matches the stored key frame image in a first searching range;

instructions for determining whether the current frame image corresponds to the distance in response to the current frame image not matching the stored key frame image in the first search range;

instructions for using the distance to obtain a second searching range of the key frame image in response to the current frame image matching the stored key frame image in the first search range, wherein the second searching range is smaller than the first searching range;

instructions for determining whether the current frame image has the matched key frame image in the second searching range; and instructions for obtaining a current pose of the visual sensor through the matched key frame image in response to the current frame image having the matched key frame image in the second searching range.

17. The robot of claim 9, wherein the ultra-wideband anchor is installed on a charging station of the robot.

* * * * *